United States Patent [19]

Hagner

[11] 4,186,670
[45] Feb. 5, 1980

[54] METHOD AND APPARATUS FOR SOWING FOREST SEEDS IN THE HUMUS LAYER

[76] Inventor: Mats Hagner, Blåbärsvägen 19, S-902 35 Umeå, Sweden

[21] Appl. No.: 859,519

[22] Filed: Dec. 12, 1977

[30] Foreign Application Priority Data

Dec. 10, 1976 [SE] Sweden ............................... 7613098

[51] Int. Cl.² .............................................. A01C 5/00
[52] U.S. Cl. .......................................... 111/1; 47/73; 111/DIG. 1
[58] Field of Search ...................... 47/9, 19, 26, 27, 28, 47/29, 30, 32, 33, 73, 74, 75, 76, 77, 78, 56, 69; 111/1

[56] References Cited

U.S. PATENT DOCUMENTS

| | | | |
|---|---|---|---|
| 1,110,377 | 9/1914 | Cowles | 47/32 |
| 1,880,136 | 9/1932 | Hickok | 47/77 |
| 2,083,571 | 6/1937 | Levandowsky | 47/73 |
| 2,725,675 | 12/1955 | Odle | 47/27 |
| 3,098,321 | 7/1963 | Estkowski et al. | 47/56 |
| 3,331,155 | 7/1967 | Chancellor | 47/74 |
| 3,678,620 | 7/1972 | Voges | 47/73 |
| 3,914,900 | 10/1975 | Bigelow et al. | 47/74 X |

OTHER PUBLICATIONS 2231307 12001974 DEX 47 69

*Primary Examiner*—Edgar S. Burr
*Assistant Examiner*—James R. Feyrer
*Attorney, Agent, or Firm*—Sughrue, Rothwell, Mion, Zinn and Macpeak

[57] ABSTRACT

Described is a method enabling forest seeds to be sown directly in the humus layer. According to the method the humus material is compacted locally and lastingly at the position in which seeds are to be sown. This is obtained by pressing down a funnel-shaped shield into the humus layer with its narrowest end downwards, and leaving the shield in the soil in an inverted position at the planting location. The seeds are then sown on the compacted material in the lower opening of the funnel.

7 Claims, 3 Drawing Figures

METHOD AND APPARATUS FOR SOWING FOREST SEEDS IN THE HUMUS LAYER

This invention relates to a method and apparatus for sowing forest seeds directly in the humus layer.

Natural sowing of forest seeds in the forest takes place in the moss during the late winter/early spring. Large quantities of the naturally sown seeds are eaten up by birds and rodents before they have had time to germinate. Of those seeds which do succeed in germinating in the moss, a large proportion dry out and die before they have grown such long roots that they reach contact with a moisture-containing soil layer. Many of the seedlings which are nevertheless obtained are damaged by various insects which feed on seedlings.

To eliminate the above-mentioned risks of damage, forest seeds are normally sown on mineral soil from which the moss and humus have been removed. Such soil preparation, which is done with special tractor-drawn units, is both time-consuming and very expensive. Moreover, soil preparation of this kind cannot be carried out in boulderous or steeply sloping terrain.

When sowing is carried out on bared mineral soil the use of a conical plastic shield which is placed over the seeds has been introduced in recent years. The plastic cone, which protects the small seedlings from birds and rodents among other things, is then placed with its base downwards on a soil layer prepared by scarification which continuously remains moist in that capillaries in the mineral soil carry water up from deeper soil layers. Attempts to sow seeds directly in the humus layer by utilizing this technique have, however, given very poor results, the reason being that the humus material dries out severely even under the cone. Moreover, so much vegetation is then developed in the cone from roots and soil stems exposed to light that the tree seedlings are outcompeted.

SUMMARY OF THE INVENTION

A main object of the present invention is to provide a method and a device enabling forest seeds to be sown directly in the humus layer, whereby all the above-mentioned disadvantages are eliminated.

This object is obtained according to the invention by providing a local and lasting compaction of the humus layer at the position in which the seeds are to be sown by pressing down a funnel-like shield into the humus layer with its narrowest end downwards, and leaving the inverted shield in such position at the planting location, said seeds then being sown on the compacted humus material in the lower opening of the funnel.

This procedure has been found to give a very good germinatability on the part of the seeds and provides, if the funnel at its upper wider opening is sealed by means of a suitable light-transmitting member, effective protection of the seedling against, inter alia, insect attacks. The good germinatability of the seeds is due in the first instance to the fact that by this means a relatively high moisture content is obtained in the compacted humus material in the lower opening of the funnel, as this compacted material allows far more effective liquid transport than the otherwise loose and capillary-lacking humus layer. In consequence of the funnel-like shape of the shield the moisture condensing on the wall of the funnel due to the temperature inside the funnel during the night being considerably lower than the temperature of the humus material outside the funnel wall will be supplied to the humus material close to the seeds and conveyed to them through the compacted humus material.

In order to obtain the highest possible moisture content at the seeds it is preferable for the funnel-like shield used to have an opening area at its narrowest end which only slightly exceeds the area occupied by the number of seeds to be sown in each position. An incidental advantage then obtained is that the competing vegetation in the funnel is reduced to a minimum. Additionally, the pressing down of the funnel into the humus layer is facilitated if the funnel opening is made small.

Preferably, the light-transmitting sealing member has the shape of a cone which at its upper end is slotted along a number of generatrices. An equivalent device can be achieved by making the shield with a lower, funnel-shaped portion which integrally changes into an upper conically narrowing portion, said shield being axially divided, the two halves thus formed being articulatingly interconnected along a generatrix.

BRIEF DESCRIPTION OF THE DRAWINGS

The invention will now be more closely described with reference to the embodiments shown by way of example in the accompanying drawing, wherein.

DETAILED DESCRIPTION OF THE PREFERRED EMBODIMENTS

Figure 1:
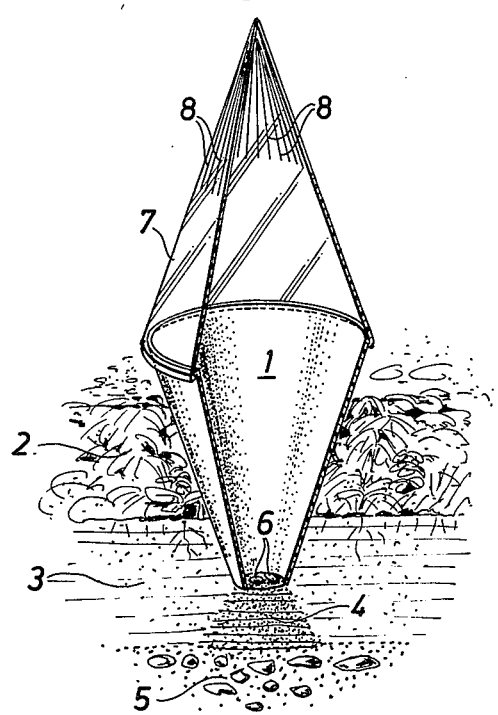
FIG. 1 shows a funnel-shaped shield with a detachable, conical cover.

Shown in FIG. 1 is a funnel-shaped shield 1, which has been pressed down through a layer of moss 2 into an underlying humus layer 3. The humus material at the lower opening of shield 1 has then been compacted, as indicated at reference numeral 4. Reference numeral 5 designates underlying mineral soil which constantly remains moist in that capillaries in the mineral soil transport water up from deeper soil layers.

After the shield 1 has been pressed down into the humus layer a number of seeds 6, usually 3-5, are sown on the compacted humus material 4 in the lower opening of the shield 1, whereupon a cover 7 is applied to the shield. The cover 7 is made of a light-transmitting material and in this embodiment is conical, which prevents fall objects such as leaves and grass from screening off the flow of light to the shield 1. At its upper end the conical cover 7 is split along a number of generatrices to form interlying tongues 8. These prevent inter alia insects from being able to attack the plant growing in the funnel, but permit the top of the plant to penetrate through the cover 7 while bending out the material tongues 8.

As mentioned above, the germinatability of the seeds 6 sown on the compacted humus material 4 in the lower opening of the shield 1 will be very good. One of the contributory reasons for this is that the shield, in consequence of its shape, will supply moisture condensing on it to the compacted humus material close to the seeds, the moisture being transportable to the seeds in consequence of the capillary effect in the compacted humus material 4. This effect can also contribute to the transport of moisture from deeper soil layers and up to the seeds 6. Through compactiang of the humus material 4 at the lower opening of the shield 1 moisture can thus transported to the seeds 6 through the otherwise loose and capillary-lacking humus layer.

To ensure the best possible moisture supply to the seeds it is of importance for the area of the lower opening of the funnel to be as close as possible to the smallest area needed in order for all the seeds which are to be sown in one funnel to rest completely against the ground.

Figure 2:
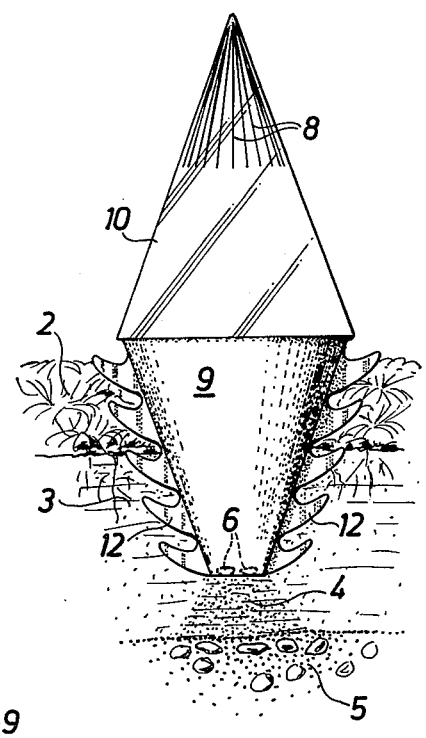
FIG. 2 shows a combined funnel-shaped shield and conical cover.
Figure 3:
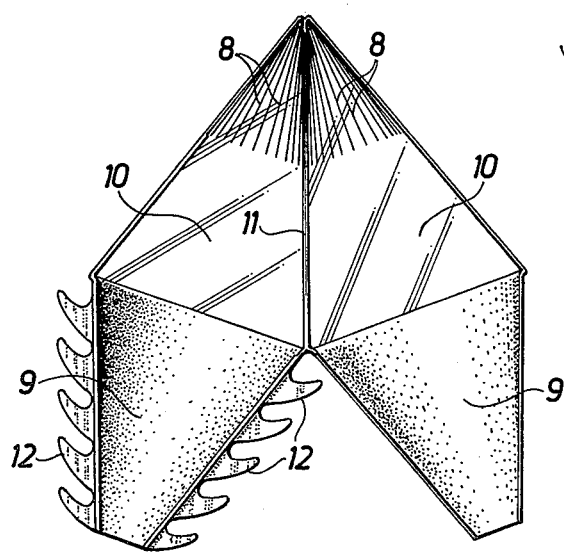
FIG. 3 shows the shield according to FIG. 2 in the opened-out condition.

Shown in FIGS. 2 and 3 is another embodiment of a shield according to the invention, which shield comprises a lower, funnel-shaped portion 9 and an upper conical portion 10 connected thereto. The combined shield is axially divided, the two halves being articulatingly interconnected along a generatrix 11 of the cone 10. In this embodiment also, the upper portion of the cone 10 is slotted to provide tongues 8. This shield is pressed, in the same way as the shield in FIG. 1, down into the humus layer 3 with the narrowest end of the funnel facing downwards. As before, this provides compacting of the humus material at the lower opening of the funnel 9, on which the wanted number of seeds are sown. For reliable retention of the shield in the ground the funnel section 9 is provided with two bands of barbs 12.

The shield according to the embodiment in FIGS. 2 and 3 possesses inter alia the advantage of being made in one piece. A further advantage of this embodiment is that the lower portion of the seedling can when growing burst apart the funnel 9 close to the lower opening. In both this and the previously described embodiment the shield is made of a readily degradable material.

By means of the technique described above it is thus possible to sow with very good results seeds directly in the humus layer, which gives substantial savings in both time and cost. The devices described above for carrying out the method can, however, be varied in several respects within the scope of the invention. Thus for example the cross-sectional area of both the funnel portion to be pressed down and the cone-shaped sealing portion can be varied as desired, depending on, inter alia, sowing method and type of soil. Both said funnel and said cone can also have broken side walls. The inclination of the walls of the funnel portion can also be chosen at will, although the funnel will be easier to press down the smaller the angle between its walls. On the other hand, there should be a certain inclination both to permit light to penetrate down to the seedling and to provide space for development of the plant. Apart from a conical shape, the cover can be given any other shape which permits the wanted light supply to the seedling. If so desired, the cover can be provided with a circumscribing groove protruding down into the funnel, provided with holes through which rain water can be supplied to inside the funnel.

What is claimed is:

1. A method of sowing forest seeds in a humus layer underlying a surface layer of moss or the like, comprising the steps of:
   (a) pressing an inverted funnel-shaped moisture shield having an open lower end through the surface layer and into the underlying humus layer to locally compact the humus layer in the area beneath the lower end of the shield,
   (b) depositing forest seeds on the compacted humus layer through the shield, and
   (c) leaving the shield in situ to moisturize the seeds by condensation.

2. A method as claimed in claim 1, wherein the open lower end of the shield has an area which only slightly exceeds the area occupied by the seeds sown therein.

3. A method as claimed in claim 2, wherein the seeds are protected by a light transmitting member which closes the wide upper opening of the shield.

4. A method as claimed in claim 3, wherein the shield integrally changes into an upper conically narrowing portion, the shield is axially divided, and the two halves thus formed are articulatingly interconnected along a generatrix.

5. An apparatus for sowing forest seeds in a humus layer underlying a surface layer of moss or the like, comprising:
   (a) a funnel-shaped moisture shield having an opening in its narrow end, said shield being of sufficient rigidity and strength to be inverted and pressed through the surface layer and into the underlying humus layer to locally compact the humus layer in the area beneath the lower end of the shield, the open narrow end of the shield having an area which only slightly exceeds the area occupied by seeds deposited on the compacted humus layer through the shield, and
   (b) a light-transmitting member closing the wide upper opening of the shield, the light-transmitting member having a cone shape and being slotted along a number of generatrices at its upper end.

6. An apparatus as claimed in claim 5, wherein the shield integrally changes into the cone shaped light transmitting member and is axially divided, the two halves thus formed being articulatingly interconnected along a generatrix.

7. An apparatus as claimed in claim 6, wherein the two halves are articulatingly interconnected along a generatrix of the upper cone.

* * * * *